(12) United States Patent
Fujii et al.

(10) Patent No.: US 7,158,561 B2
(45) Date of Patent: Jan. 2, 2007

(54) COMMUNICATION SYSTEM, COMMUNICATION DEVICE, AND COMMUNICATION METHOD

(75) Inventors: Teruko Fujii, Tokyo (JP); Yoshimasa Baba, Tokyo (JP); Yasuyuki Nagashima, Tokyo (JP); Masataka Kato, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 847 days.

(21) Appl. No.: 10/049,287

(22) PCT Filed: Jun. 12, 2001

(86) PCT No.: PCT/JP01/04973

§ 371 (c)(1),
(2), (4) Date: Feb. 11, 2002

(87) PCT Pub. No.: WO02/11371

PCT Pub. Date: Feb. 7, 2002

(65) Prior Publication Data

US 2002/0106011 A1 Aug. 8, 2002

(30) Foreign Application Priority Data

Jul. 28, 2000 (JP) .............................. 2000-229651

(51) Int. Cl.
*H04B 1/38* (2006.01)
(52) U.S. Cl. ...................... 375/219; 375/212; 375/220; 375/356; 340/10.2; 370/235; 370/312; 370/432; 370/455; 709/235
(58) Field of Classification Search ................ 375/212, 375/219, 220, 222, 257, 356; 709/235; 370/235–236, 370/312, 432, 445–446, 455; 340/10.2; 439/65, 439/489, 955
See application file for complete search history.

(56) References Cited

U.S. PATENT DOCUMENTS

| 4,271,507 A | * | 6/1981 | Gable et al. ................. 370/432 |
| 4,672,543 A |   | 6/1987 | Matsui et al. |
| 5,836,785 A | * | 11/1998 | Lee ............................. 439/505 |
| 6,456,191 B1 | * | 9/2002 | Federman ................... 340/10.2 |

FOREIGN PATENT DOCUMENTS

| JP | SHO 57-28988 B | 6/1982 |
| JP | SHO 59-41943 A | 3/1984 |
| JP | SHO 59-100655 A | 6/1984 |
| JP | SHO 60-226248 | 11/1985 |
| JP | SHO 60-242749 A | 12/1985 |
| JP | SHO 61-71738 A | 4/1986 |
| JP | SHO 62-159549 A | 7/1987 |

(Continued)

*Primary Examiner*—Jean B. Corrielus
*Assistant Examiner*—Edith Chang
(74) *Attorney, Agent, or Firm*—Birch, Stewart, Kolasch & Birch, LLP

(57) ABSTRACT

Respective nodes N1 to N3 only detect a carrier, and the node N3 sets a random time between a time after a certain period of time t1 and a time until a certain period of time t2 after the carrier of data D11 is gone as a waiting time so as to transmit data within this waiting time. The node N2 transmits ACK data D12 with respect to the data D11 to the node N1 before the certain period of time t1 after the carrier of the data D11 is gone. The node N3 detects the carrier of the ACK data D12 and again sets a random time after the certain period of time t1 until the certain period of time t2 to transmit the data.

6 Claims, 6 Drawing Sheets

FOREIGN PATENT DOCUMENTS

| | | |
|---|---|---|
| JP | SHO 62-181546 | 8/1987 |
| JP | SHO 62-245834 | 10/1987 |
| JP | HEI 1-295544 A | 11/1989 |
| WO | WO 02/11371 A1 | 2/2002 |

\* cited by examiner

FIG.1
(a) 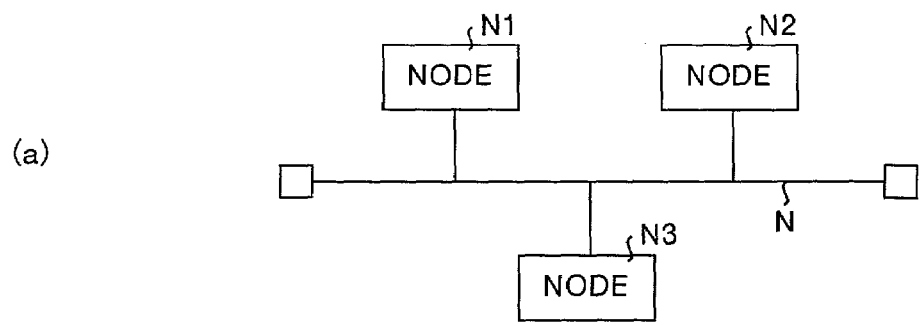
(b) 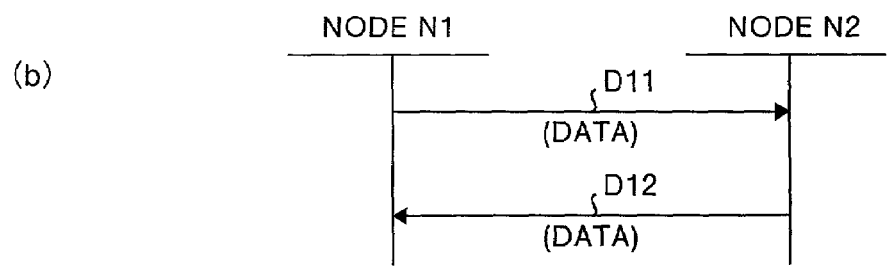
(c) 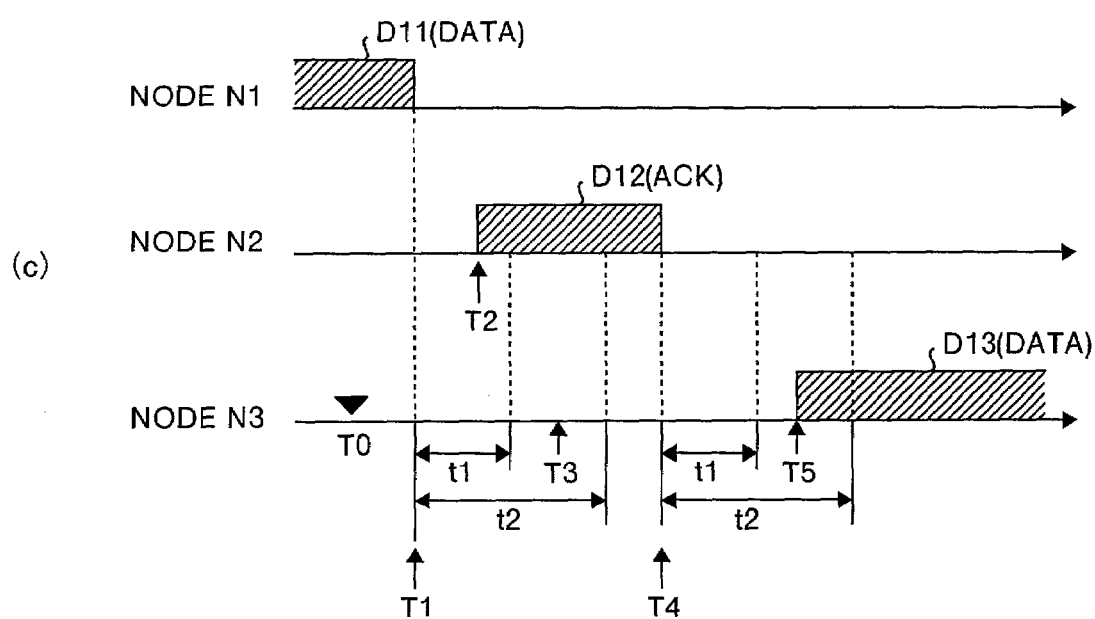

FIG.3
(a)
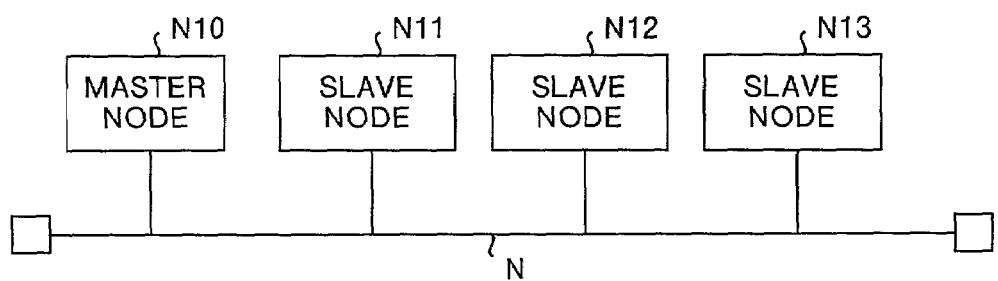
(b)
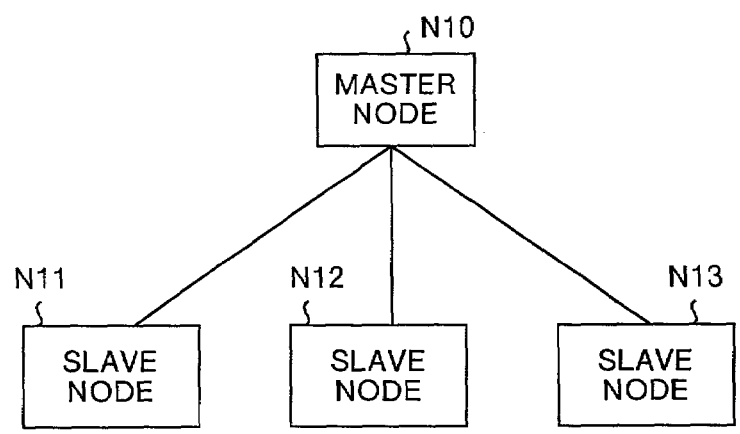

FIG.8
CONVENTIONAL ART
(a)
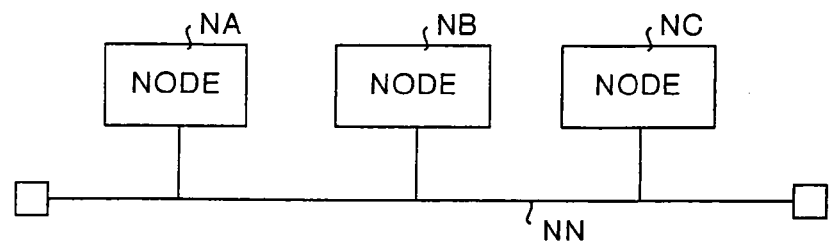
(b)
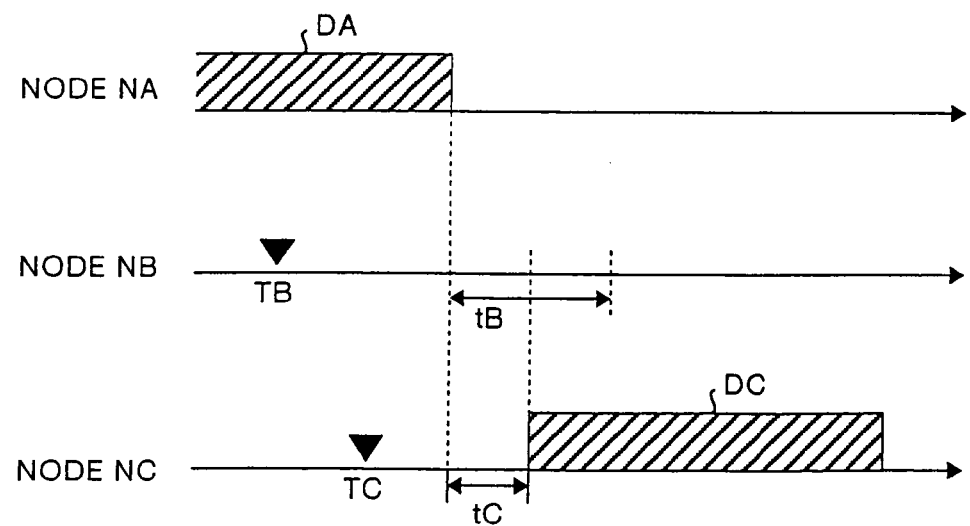

COMMUNICATION SYSTEM, COMMUNICATION DEVICE, AND COMMUNICATION METHOD

This application is the national phase under 35 U.S.C. § 371 of PCT International Application No. PCT/JP01/04973 which has an International filing date of Jun. 12, 2001, which designated the United States of America.

TECHNICAL FIELD

The present invention relates to a communication system, a communication device, and a communication method by which a plurality of communication devices connected to a transmission line adjust transmission timing of data based on a detection result of a carrier signal of another communication device to prevent a collision between signals, whereby the data can be efficiently transmitted/received.

BACKGROUND ART

In recent years, in order to reduce costs and effectively employ existing equipment without newly installing more communication facilities, a "power line modem" in which communication is performed utilizing an existing power line (also called an electric light line) has received attention. By networking electrical appliances, such as of inside/outside houses, buildings, factories, and stores, connected by a power line, the power line modem can perform various processes such as control of the appliances and data communication.

As a wired system digital communication other than networking of such electrical appliances, that is, a network communication that employs a plurality of power line modems which are multiply connected outside houses, Internet communication and the like employing a personal computer may be cited.

In a bus-type network such as the power line and the like, access control is performed, conventionally employing CSMA/CD (Carrier Sense Multiple Access/Collision Detection) system. In the CSMA/CD system, each node monitors a transmission medium such as a power line, confirms that there is no carrier on the transmission medium, and transmits a packet from itself node, and when detecting a collision, waits a certain period of time to retry the transmission of the packet. A collision is detected, for example, by a monitor electric power of the time of a collision is doubled, or a node itself receives data transmitted and confirms whether the data corresponds to detect a collision.

Processing in which the CSMA/CD system is employed is explained. FIG. 8 is explanatory views explaining the CSMA/CD system. FIG. 8(*a*) is a diagram illustrating a bus-type network in which three nodes NA to NC are connected to a transmission line NM, and FIG. 8(*b*) is a time chart illustrating access control by the CSMA/CD system. In FIG. 8, when transmission requests are generated at time points TB, TC on the nodes NB, NC, respectively, while the node NA is sending out data DA, the nodes NB, NC are monitoring the carrier of the data DA on the transmission line NN and perform access control to permit transmission after waiting times tB, tC which are decided by random numbers from the time when the carrier of the data DA is gone. In this case, since the waiting time tB is longer than the waiting time tC, data DC is sent out to the transmission line NN from the node NC prior to others. As result, the node NB detects a carrier on the transmission line NN once again, and awaiting time decided by random numbers is again set so that data is sent out after this waiting time that is after the carrier of the data DC is gone.

However, in a bus-type network which does not adopt the CSMA/CD system described above and is composed of a node detecting only a carrier on a transmission medium, a collision cannot be detected. Thus, when ACK data representing a reception confirmation transmitted after a data transmission from the node of a transmission destination collides, since retransmission of the transmission data is executed and the node of the transmission destination doubly receives the same transmission data, there is a problem that the transmission efficiency deteriorates.

That is, when a collision can be detected, since the collision of the ACK data can be detected, only retransmission of the ACK data may be performed. However, when the collision of the ACK data cannot be detected, it is determined that the transmission data has not been normally received based on the phenomenon that the node of the transmission destination has not received the ACK data within a predetermined time period, and the transmission data is retransmitted so that the transmission destination node performs a process of receiving the transmission data.

It is an object of the present invention to provide a communication system, a communication device, and a communication method wherein the transmission efficiency can be easily improved even when an access system that does not detect a collision in a bus-type network is adopted.

DISCLOSURE OF THE INVENTION

In the communication system according to one aspect of the present invention, a plurality of communication devices connected to a transmission line adjust transmission timing of data based on a detection result of a carrier signal of another communication device to prevent a collision between signals, there by performing transmission/reception of the data. Each respective communication device comprise a transmission control unit which, when newly transmitting the data, transmits the data to the transmission line at a random time randomly representing a time existing after a first time elapses until a second time elapses from a time when a carrier signal on the transmission line is gone and, when transmitting a data whose priority is high, transmits the data to the transmission line before the first time.

According to the above-mentioned aspect of this invention, the transmission control unit, when newly transmitting the data, transmits the data to the transmission line at a random time randomly representing a time existing after a first time elapses until a second time elapses from a time when a carrier signal on the transmission line is gone and, when transmitting a data whose priority is high, transmits the data to the transmission line before the first time so as to avoid a collision of the data whose priority is high.

In the communication system according to the above-mentioned aspect, the data whose priority is high is ACK data representing a reception confirmation.

Thus, by setting the data whose priority is high as ACK data representing a reception confirmation, a collision of the ACK data may be avoided.

In the communication system according to the above-mentioned aspect, the data whose priority is high is NACK data representing a non-reception confirmation with respect to reception of a series of data groups to which sequence numbers are assigned.

Thus, by setting the data whose priority is high is NACK data representing a non-reception confirmation with respect to reception of a series of data groups to which sequence numbers are assigned, a collision of the NACK data may be avoided.

In the communication system according to another aspect of the present invention, a plurality of communication devices connected to a transmission line are divided into one master communication device and other slave communication devices to logically form a star-type connection and adjust transmission timing of data based on a detection result of a carrier signal of another communication device to prevent a collision between signals, thereby performing transmission/reception of the data via the master communication device. The master communication device comprises a transmission control unit which, when newly transmitting the data, transmits the data to the transmission line at a random time randomly representing a time existing after a first time elapses until a second time elapses from a time when a carrier signal on the transmission line is gone and, when transmitting a data that has been relayed, transmits the data to the transmission line before the first time.

According to the above-mentioned aspect of this invention, the transmission control unit of the master communication device, when newly transmitting the data, transmits the data to the transmission line at a random time randomly representing a time existing after a first time elapses until a second time elapses from a time when a carrier signal on the transmission line is gone and, when transmitting a data that has been relayed, transmits the data to the transmission line before the first time so as to avoid a collision of the data relayed.

In the communication system according to still another aspect of the present invention, a plurality of communication devices connected to a transmission line are divided into one master communication device and other slave communication devices to logically form a star-type connection and adjust transmission timing of data based on a detection result of a carrier signal of another communication device to prevent a collision between signals, thereby performing transmission/reception of the data via the master communication device. The master communication device comprises a transmission control unit which, when newly transmitting the data, transmits the data to the transmission line at a random time randomly representing a time existing after a first time elapses until a second time elapses from a time when a carrier signal on the transmission line is gone and, when receiving a data that has been relayed, transmits ACK data representing a reception confirmation of the data after the reception of the data is confirmed before the first time and transmits the data relayed to the transmission line before the first time from a time when a carrier signal of the ACK data is gone.

According to the above-mentioned aspect of this invention, the transmission control unit of the master communication device, when newly transmitting the data, transmits the data to the transmission line at a random time randomly representing a time existing after a first time elapses until a second time elapses from a time when a carrier signal on the transmission line is gone and, when receiving a data that has been relayed, transmits ACK data representing a reception confirmation of the data after the reception of the data is confirmed before the first time and transmits the data relayed to the transmission line before the first time from a time when a carrier signal of the ACK data is gone so as to decrease processes of ACK data in a series of transmission processes.

In the communication system according to still another aspect of the present invention, a plurality of communication devices connected to a transmission line are divided into one master communication device and other slave communication devices to logically form a star-type connection and adjust transmission timing of data based on a detection result of a carrier signal of another communication device to prevent a collision between signals, thereby performing transmission/reception of the data via the master communication device. The master communication device comprises a transmission control unit which transmits the data to the transmission line at a random time randomly representing a time existing after a first time elapses until a second time elapses from a time when a carrier signal on the transmission line is gone when newly transmitting the data and, repeating processing in which the master communication device transmits ACK data representing a reception confirmation of the data after the reception of the data is confirmed before the first time, transmits the multi-address data relayed to the transmission line before the first time from a time when a carrier signal of the ACK data is gone, and transmits the multi-address data before the first time from a time when a carrier signal of the multi-address data is gone in a case where multi-address data relayed is received.

According to the above-mentioned aspect of this invention, the transmission control unit of the master communication device, when newly transmitting the data, transmits the data to the transmission line at a random time randomly representing a time existing after a first time elapses until a second time elapses from a time when a carrier signal on the transmission line is gone and, in a case where multi-address data relayed is received, repeats processing in which the master communication device transmits ACK data representing a reception confirmation of the data after the reception of the data is confirmed before the first time, transmits the multi-address data relayed to the transmission line before the first time from a time when a carrier signal of the ACK data is gone, and transmits the multi-address data before the first time from a time when a carrier signal of the multi-address data is gone so as to avoid a collision of the multi-address data.

In the communication system according to still another aspect of the present invention, a plurality of communication devices connected to a transmission line are divided into one master communication device and other slave communication devices to logically form a star-type connection and adjust transmission timing of data based on a detection result of a carrier signal of another communication device to prevent a collision between signals, thereby performing transmission/reception of the data via the master communication device. The communication device comprises a transmission control unit which transmits the data to the transmission line at a random time randomly representing a time existing after a first time elapses until a second time elapses from a time when a carrier signal on the transmission line is gone in a case where the communication device newly transmits data and, transmits collision avoidance data that is arbitrary data generating a carrier signal on the transmission line at a random time randomly representing a time existing after a first time elapses until a second time elapses from a time when a carrier signal on the transmission line is gone in a case where multi-address data is transmitted and transmits the multi-address data before the first time from a time when a carrier signal of the collision avoidance data is gone, and the transmission control unit of the master communication device, when receiving the multi-address data, repeats processing in which the multi-address data is transmitted to the transmission line before the first time from a time when the carrier signal of the multi-address data is gone.

According to the above-mentioned aspect of this invention, the transmission control unit of the communication device, in a case where the communication device newly transmits data, transmits the data to the transmission line at a random time randomly representing a time existing after a first time elapses until a second time elapses from a time when a carrier signal on the transmission line is gone and, in a case where multi-address data is transmitted, transmits collision avoidance data that is arbitrary data generating a carrier signal on the transmission line at a random time randomly representing a time existing after a first time elapses until a second time elapses from a time when a carrier signal on the transmission line is gone and transmits the multi-address data before the first time from a time when a carrier signal of the collision avoidance data is gone, and the transmission control unit of the master communication device, when receiving the multi-address data, repeats processing in which the multi-address data is transmitted to the transmission line before the first time from a time when the carrier signal of the multi-address data is gone so as to avoid even a collision of the data transmitted from the communication device of the transmission source.

In the communication system according to still another aspect of the present invention, a plurality of communication devices connected to a transmission line are divided into one master communication device and other slave communication devices to logically form a star-type connection and adjust transmission timing of data based on a detection result of a carrier signal of another communication device to prevent a collision between signals, thereby performing transmission/reception of the data via the master communication device, the communication device comprises a transmission control unit which transmits the data to the transmission line at a random time randomly representing a time existing after a first time elapses until a second time elapses from a time when a carrier signal on the transmission line is gone in a case where the communication device newly transmits data and, transmits collision avoidance data that is arbitrary data generating a carrier signal on the transmission line at a random time randomly representing a time existing after a first time elapses until a second time elapses from a time when a carrier signal on the transmission line is gone and transmits the data whose priority is high before the first time from a time when a carrier signal of the collision avoidance data is gone when transmitting a data whose priority is high, and the transmission control unit of the master communication device, when the data whose priority is high is received, transmits the data whose priority is high to the transmission line before the first time from a time when the carrier signal of the data whose priority is high is gone.

According to the above-mentioned aspect of this invention, the transmission control unit of the communication device, in a case where the communication device newly transmits data, transmits the data to the transmission line at a random time randomly representing a time existing after a first time elapses until a second time elapses from a time when a carrier signal on the transmission line is gone and, when transmitting a data whose priority is high, transmits collision avoidance data that is arbitrary data generating a carrier signal on the transmission line at a random time randomly representing a time existing after a first time elapses until a second time elapses from a time when a carrier signal on the transmission line is gone and transmits the data whose priority is high before the first time from a time when a carrier signal of the collision avoidance data is gone, and the transmission control unit of the master communication device, when the data whose priority is high is received, transmits the data whose priority is high to the transmission line before the first time from a time when the carrier signal of the data whose priority is high is gone so as to avoid a collision of the data whose priority is high.

The communication device according to still another aspect of the present invention is employed in a communication system in which a plurality of communication devices connected to a transmission line adjust transmission timing of data based on a detection result of a carrier signal of another communication device to prevent a collision between signals, there by performing transmission/reception of the data. The communication device comprises a transmission control unit which transmits the data to the transmission line at a random time randomly representing a time existing after a first time elapses until a second time elapses from a time when a carrier signal on the transmission line is gone when newly transmitting the data and, transmits the data to the transmission line before the first time when transmitting a data whose priority is high.

According to the above-mentioned aspect of this invention, the transmission control unit, when newly transmitting the data, transmits the data to the transmission line at a random time randomly representing a time existing after a first time elapses until a second time elapses from a time when a carrier signal on the transmission line is gone and, when transmitting a data whose priority is high, transmits the data to the transmission line before the first time.

The communication device according to still another aspect of the present invention is employed in a communication system in which a plurality of communication devices connected to a transmission line adjust transmission timing of data based on a detection result of a carrier signal of another communication device to prevent a collision between signals, there by performing transmission/reception of the data. The communication device comprises a transmission control unit which transmits the data to the transmission line at a random time randomly representing a time existing after a first time elapses until a second time elapses from a time when a carrier signal on the transmission line is gone when newly transmitting the data and, transmits collision avoidance data that is arbitrary data generating a carrier signal on the transmission line at a random time randomly representing a time existing after a first time elapses until a second time elapses from a time when a carrier signal on the transmission line is gone and transmits the data whose priority is high to the transmission line before the first time from a time when a carrier signal of the collision avoidance data is gone when transmitting a data whose priority is high.

According to the above-mentioned aspect of this invention, the transmission control unit, when newly transmitting the data, transmits the data to the transmission line at a random time randomly representing a time existing after a first time elapses until a second time elapses from a time when a carrier signal on the transmission line is gone and, when transmitting a data whose priority is high, transmits collision avoidance data that is arbitrary data generating a carrier signal on the transmission line at a random time randomly representing a time existing after a first time elapses until a second time elapses from a time when a carrier signal on the transmission line is gone and transmits the data whose priority is high to the transmission line before the first time from a time when a carrier signal of the collision avoidance data is gone.

The communication method according to still another aspect of this invention is a method of performing transmission/reception of the data among a plurality of communication devices connected to a transmission line adjust transmission timing of data based on a detection result of a carrier signal of another communication device to prevent a collision between signals. The communication method comprises a data transmission step of, when newly transmitting the data, transmits the data to the transmission line at a random time randomly representing a time existing after a first time elapses until a second time elapses from a time when a carrier signal on the transmission line is gone and a priority data transmission step of, in a case where a transmission request of data whose priority is high is generated, transmits the data whose priority is high to the transmission line before the first time.

According to the above-mentioned aspect of this invention, in the data transmission step, when newly transmitting the data, the respective communication devices transmit the data to the transmission line at a random time randomly representing a time existing after a first time elapses until a second time elapses from a time when a carrier signal on the transmission line is gone, and in the priority data transmission step, in a case where a transmission request of data whose priority is high is generated, the data whose priority is high is transmitted to the transmission line before the first time.

In the communication method according to the above-mentioned aspect, the data whose priority is high is ACK data representing a reception confirmation.

Thus, by setting the data whose priority is high as ACK data representing a reception confirmation, a collision of the ACK data may be avoided.

In the communication method according to the above-mentioned aspect, the data whose priority is high is NACK data representing a non-reception confirmation with respect to reception of a series of data groups to which sequence numbers are assigned.

Thus, by setting the data whose priority is high is NACK data representing a non-reception confirmation with respect to reception of a series of data groups to which sequence numbers are assigned, a collision of the NACK data may be avoided.

The communication method according to still another aspect of this invention is a method of performing transmission/reception of the data among a plurality of communication devices connected to a transmission line are divided into one master communication device and other slave communication devices to logically form a star-type connection and adjust transmission timing of data based on a detection result of a carrier signal of another communication device to prevent a collision between signals via the master communication device. The communication method comprises a data transmission step of, transmitting the data to the master communication device at a random time randomly representing a time existing after a first time elapses until a second time elapses from a time when a carrier signal on the transmission line is gone in a case where a slave communication device of a transmission source transmits data whose transmission is requested; a data relay step in which the master communication device that has received the data receives the data and transmits the data to a slave communication device of a transmission destination before the first time elapses from a time when a carrier signal of the data on the transmission line is gone; an ACK transmission step in which the slave communication device of the transmission destination transmits ACK data representing a reception confirmation to the master communication device after the reception of the data is confirmed before the first time; and an ACK relay transmission step in which the master communication device that has received the ACK data receives the ACK data and transmits the ACK data to the slave communication device of the transmission source before the first time elapses from a time when a carrier signal of the ACK data on the transmission line is gone.

According to the above-mentioned aspect of this invention, in the data transmission step, in a case where a slave communication device of a transmission source transmits data whose transmission is requested, the data is transmitted to the master communication device at a random time randomly representing a time existing after a first time elapses until a second time elapses from a time when a carrier signal on the transmission line is gone, in the data relay step, the master communication device that has received the data receives the data and transmits the data to a slave communication device of a transmission destination before the first time elapses from a time when a carrier signal of the data on the transmission line is gone, in the ACK transmission step, the slave communication device of the transmission destination transmits ACK data representing a reception confirmation to the master communication device after the reception of the data is confirmed before the first time, and in the ACK relay transmission step, the master communication device that has received the ACK data receives the ACK data and transmits the ACK data to the slave communication device of the transmission source before the first time elapses from a time when a carrier signal of the ACK data on the transmission line is gone.

The communication method according to still another aspect of this invention is a method of performing transmission/reception of the data among a plurality of communication devices connected to a transmission line are divided into one master communication device and other slave communication devices to logically form a star-type connection and adjust transmission timing of data based on a detection result of a carrier signal of another communication device to prevent a collision between signals via the master communication device. The communication method comprises a data transmission step of transmitting the data to the master communication device at a random time randomly representing a time existing after a first time elapses until a second time elapses from a time when a carrier signal on the transmission line is gone in a case where a slave communication device of a transmission source transmits data whose transmission is requested, an ACK transmission step in which the master communication device that has received the data transmits ACK data representing a reception confirmation to the slave communication device of the transmission source after the reception of the data is confirmed before the first time, and a data relay transmission step in which the master communication device transmits the data to a slave communication device of a transmission destination after the transmission of the ACK data before the first time from a time when a carrier signal of the ACK data is gone.

According to the above-mentioned aspect of this invention, in the data transmission step, in a case where a slave communication device of a transmission source transmits data whose transmission is requested, the data is transmitted to the master communication device at a random time randomly representing a time existing after a first time elapses until a second time elapses from a time when a carrier signal on the transmission line is gone, in the ACK transmission step, the master communication device that has received the data transmits ACK data representing a reception confirmation to the slave communication device of the transmission source after the reception of the data is confirmed before the first time, and in the data relay transmission step, the master communication device transmits the data to a slave communication device of a transmission destination after the transmission of the ACK data before the first time from a time when a carrier signal of the ACK data is gone.

The communication method according to still another aspect of this invention is a method of performing transmission/reception of the data among a plurality of communication devices connected to a transmission line are divided into one master communication device and other slave communication devices to logically form a star-type connection and adjust transmission timing of data based on a detection result of a carrier signal of another communication device to prevent a collision between signals via the master communication device. The communication method comprises a multi-address data transmission step of transmitting the multi-address data to the master communication device at a random time randomly representing a time existing after a first time elapses until a second time elapses from a time when a carrier signal on the transmission line is gone in a case where a slave communication device of a transmission source transmits multi-address data whose transmission is requested, an ACK transmission step in which the master communication device that has received the multi-address data transmits ACK data representing a reception confirmation to the slave communication device of the transmission source after the reception of the multi-address data is confirmed before the first time, and a multi-address data relay transmission step of repeating processing in which the master communication device transmits the multi-address data to a slave communication device of a transmission destination after the transmission of the ACK data before the first time from a time when a carrier signal of the ACK data is gone and transmits the multi-address data to a slave communication device of a transmission destination before the first time from a time when a carrier signal of the multi-address data is gone.

According to the above-mentioned aspect of this invention, in the multi-address data transmission step, in a case where a slave communication device of a transmission source transmits multi-address data whose transmission is requested, the multi-address data is transmitted to the master communication device at a random time randomly representing a time existing after a first time elapses until a second time elapses from a time when a carrier signal on the transmission line is gone, in the ACK transmission step, the master communication device that has received the multi-address data transmits ACK data representing a reception confirmation to the slave communication device of the transmission source after the reception of the multi-address data is confirmed before the first time, and in the multi-address data relay transmission step, the master communication device repeats processing in which the master communication device transmits the multi-address data to a slave communication device of a transmission destination after the transmission of the ACK data before the first time from a time when a carrier signal of the ACK data is gone and transmits the multi-address data to a slave communication device of a transmission destination before the first time from a time when a carrier signal of the multi-address data is gone.

The communication method according to still another aspect of this invention is a method of performing transmission/reception of the data among a plurality of communication devices connected to a transmission line are divided into one master communication device and other slave communication devices to logically form a star-type connection and adjust transmission timing of data based on a detection result of a carrier signal of another communication device to prevent a collision between signals, thereby performing transmission/reception of the data via the master communication device, the communication method comprises a collision avoidance data transmission step of transmitting collision avoidance data that is arbitrary data generating a carrier signal on the transmission line at a random time randomly representing a time existing after a first time elapses until a second time elapses from a time when a carrier signal on the transmission line is gone in a case where a slave communication device of a transmission source transmits multi-address data whose transmission is requested, a multi-address data relay transmission step in which the slave communication device of the transmission source transmits the multi-address data to the master communication device before the first time from a time when a carrier signal of the collision avoidance data is gone, and an multi-address data relay transmission step of repeating processing in which the master communication device that has received the multi-address data transmits the multi-address data to a slave communication device of a transmission destination before the first time from a time when a carrier signal of the multi-address data is gone and transmits the multi-address data to a slave communication device of a transmission destination before the first time from a time when a carrier signal of the multi-address data is gone.

According to the above-mentioned aspect of this invention, in the collision avoidance data transmission step, in a case where a slave communication device of a transmission source transmits multi-address data whose transmission is requested, collision avoidance data that is arbitrary data generating a carrier signal on the transmission line is transmitted at a random time randomly representing a time existing after a first time elapses until a second time elapses from a time when a carrier signal on the transmission line is gone, in the multi-address data relay transmission step, the slave communication device of the transmission source transmits the multi-address data to the master communication device before the first time from a time when a carrier signal of the collision avoidance data is gone, and in the multi-address data relay transmission step, the master communication device repeats processing in which the master communication device that has received the multi-address data transmits the multi-address data to a slave communication device of a transmission destination before the first time from a time when a carrier signal of the multi-address data is gone and transmits the multi-address data to a slave communication device of a transmission destination before the first time from a time when a carrier signal of the multi-address data is gone so as to avoid even a collision of the data transmitted from the communication device of the transmission source.

BRIEF DESCRIPTION OF THE DRAWINGS

FIG. 1 is views illustrating the structure of a communication system and access control processing according to a first embodiment of the present invention;

FIG. 3 is block diagrams illustrating the structure of a communication system according to a third embodiment of the present invention;

FIG. 8 is views illustrating the structure of a conventional communication system and access control processing in which the CSMA/CD system is employed.

BEST MODE FOR CARRYING OUT THE INVENTION

Figure 2:
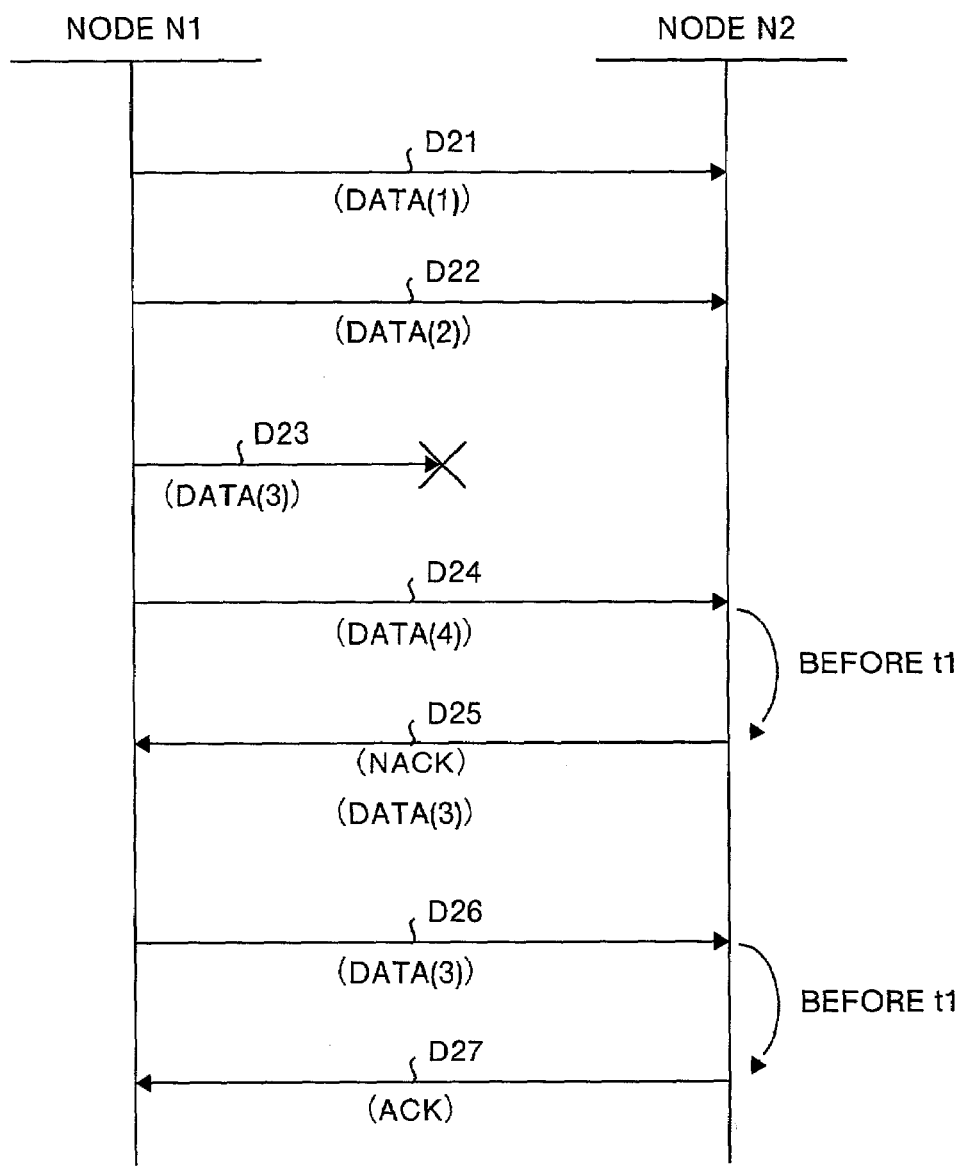
FIG. 2 is a sequence chart illustrating access control processing of a communication system according to a second embodiment of the present invention.

Embodiments of the communication system, the communication device, and the communication method in accordance with the present invention will be explained in detail below while referring to the accompanying drawings.

First Embodiment:

FIG. 1 is a block diagram illustrating the structure of a communication system and the access control thereof according to a first embodiment of the present invention. FIG. 1(a) shows the structure of the communication system, FIG. 1(b) shows one example of data transmission/reception between a node N1 and a node N2, and FIG. 1(c) shows a timing chart explaining the access control by nodes N1 to N3. In FIG. 1, in this communication system, the plural nodes N1 to N3 are connected to a transmission line N, such as a power line, in a bus-type manner. The respective nodes N1 to N3 can detect a carrier signal on the transmission line N but cannot detect a collision.

In general, in a transmission/reception process of data, a node of a reception side which has received transmission data sends back ACK data showing whether or not the data is normally received to the node of a transmission source. For example, as shown in FIG. 1(b), when the node N1 transmits data D11 to the node N2, the node N2 sends back ACK data D12 of reception confirmation showing that the data is normally received to the node N1.

In the present communication system, since the respective nodes N1 to N3 cannot detect a collision, the respective nodes N1 to N3 perform access control shown in FIG. 1(c). In FIG. 1(c), a case is considered where a transmission request of data is generated at the node N3 at a time point T0 while the node N1 transmits data D11 to the transmission line N. The node N3 detects the carrier of the data D11 and sets a time point T3 present between the time after a time t1 taking a time point T1 as an origin point elapses and a time t2, that is after the time point T1 where the carrier of the data D11 is gone, as a waiting time generated by random number generation.

The node N2 which has received the data D11 detects "EOF" or the like representing the end of real data in the data D11 to confirm reception and sends out the ACK data D12 for the data D11 to the transmission line N at a time point T2 before a time t1 after the time T1 to send it to the node N1. Therefore, the ACK data D12 can be transmitted having priority over general data D13, and through the transmission of the ACK data D12, the node N3 tries to transmit the data D13 at a time point T5 set within a certain period of time before a time t2 after a time t1 elapses from a time point T4 at which the carrier of the ACK data D12 is gone again.

That is, the general data, after detecting that the carrier is gone, cannot be transmitted for a certain period of time of t1, and only the ACK data D12 is sent during the certain period of time t1. Thus, a collision of the ACK data can be reliably avoided, and since retransmission of transmission data due to the collision of the ACK data is not needed, the transmission efficiency is improved remarkably. Specifically, in a case where a transmission of data whose data length is long succeeds, when ACK data whose length is short collides, a transmission line N is occupied in a time span in the retransmission of the data whose data length is long. However, in the first embodiment, since the ACK data does not collide, the transmission efficiency is improved remarkably. Since the waiting time of general data is generated by random numbers, a collision hardly occurs. However, when waiting times are nearly the same time, a collision occurs.

Besides ACK data, when transmitting a data whose priority is high, by transmitting the data whose priority is high during the certain period of time t1 from the time when the carrier on the transmission line N is gone similarly to the case of ACK data, a collision of the data whose priority is high can be reliably avoided. When both of a collision of ACK data and a collision of data whose priority is high should be avoided, the certain period of time t1 may further be divided, and the respective divided times may be allocated to the each data.

In the first embodiment, waiting time decided by random numbers is not set during a certain period of time starting from the time when a carrier on the transmission line N is gone, but waiting time decided by random numbers is set from a point in time when the certain period of time t1 elapses from the time when a carrier on the transmission line N is gone. In this waiting time, transmission permission for general data is performed, and transmission of ACK data is permitted in the certain period of time t1 from the time when a carrier on the transmission line N is gone. Thus, a collision of ACK data can be reliably avoided, and therefore the transmission efficiency can be improved remarkably.

Second Embodiment:

Next, a second embodiment of the present invention is explained. Although the first embodiment described above is to reliably avoid a collision of ACK data, the second embodiment is to reliably avoid a collision of NACK data that is for retransmitting part of data in a case where a series of data is transmitted and when the part of data in the series of data cannot be received normally.

FIG. 2 is a sequence chart explaining access control by a communication system according to the second embodiment of the present invention. The structure of the communication system is the same as that of the first embodiment. Here, a case is considered where the node N1 divides data whose data length is long into four data (1) to data (4) to transmit them as a series of data. A series of sequence numbers is assigned to the respective data (1) to data (4). In FIG. 2, the node N1 first transmits data D21 of the data (1) to the node N2 at a time point after a certain period of time t1 elapses from a time point when a carrier on the transmission line N is gone. A similar waiting time is set so that the data (2) to the data (4) are transmitted to the node N2 as data D22 to D24 one after another.

Here, in a case where data D23 of the data (3) collides, when the node N2 detects that the node N2 could not normally received the data (3) of sequence number "3," the node N2 sends back NACK data D25, representing that the data (3) could not be received, to the node N1 after receiving data D24 that is final series data (4) before the certain period of time t1 from a time point when the carrier of the data D24 is gone. Since the NACK data D25 is transmitted as the only data within the certain period of time t1 that is shorter than a general waiting time period, a collide can be reliably avoided similarly to the case of ACK data in the first embodiment.

The node N1 that has received the NACK data D25 transmits data (3) that corresponds to the sequence number "3" shown in the NACK data D25 to the node N2 as data D26. Thereafter, when the node N2 receives all of the series of data in the end, the node N2 transmits ACK data D27 to the node N1 side before the certain period of time t1 similarly to the first embodiment.

In the second embodiment, in a case where a series of data is transmitted sequentially, when part of data of the series of data could not be received normally, since NACK data is sent back after the final series of data is received before the certain period of time t1, a collision of NACK data can be reliably avoided, and retransmission of a series of data is not needed, whereby the transmission efficiency can be remarkably improved.

Third Embodiment:

Next, a third embodiment of the present invention is explained. In the third embodiment, one node among nodes constituting a bus-type network is set as a master node, other nodes are set as slave nodes to form a logical star network, each of the master node and the respective slave nodes transmit/receive data, and the access control shown in the first embodiment described above is applied to the communication system in which data transmission/reception is performed among the respective slave nodes via the master node so as to improve the transmission efficiency.

FIG. 3 is diagrams illustrating the structure of a communication system according to the third embodiment of the present invention. FIG. 3(a) is a diagram illustrating the physical structure of the communication system, and FIG. 3(b) is a diagram illustrating the logical structure of the communication system shown in FIG. 3(a). In FIG. 3, in the communication system, a plurality of nodes N10 to N13 are connected to the transmission line N in a bus-type connection, the node N10 in the nodes N10 to N13 is set as a master node, and the nodes N11 to N13 are set as slave nodes connected to the master node N10 in a star-type connection. The respective slave nodes N11 to N13 transmit/receive data to/from the master node N10, and the transmission/reception of data among the respective slave nodes N11 to N13 is performed via the master node N10.

Figure 4:
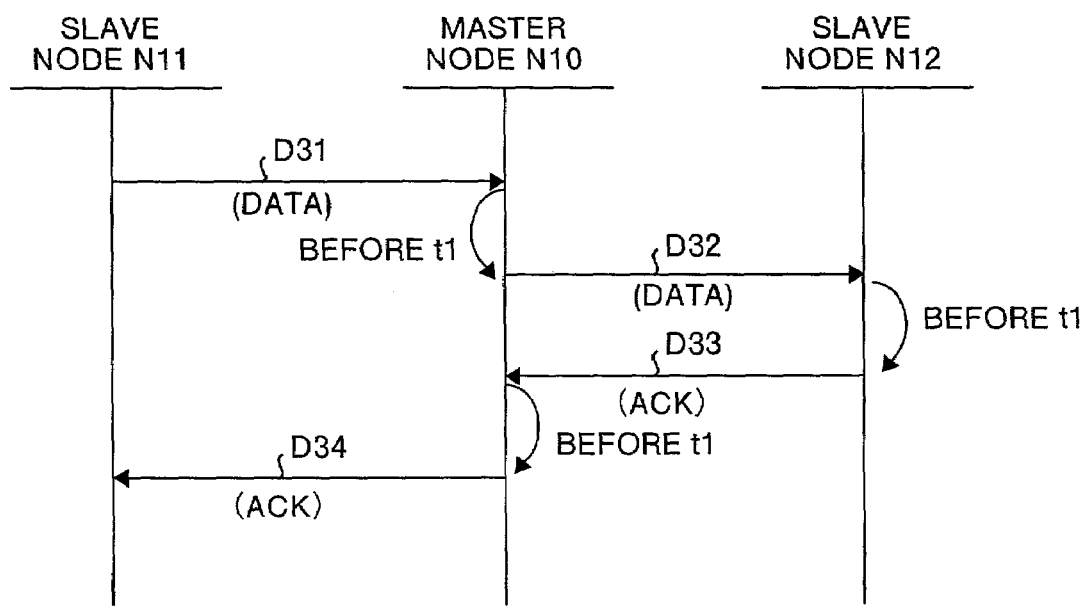
FIG. 4 is a sequence chart illustrating access control processing of a communication system according to the third embodiment of the present invention.

Here, a process in which the slave node N11 transmits data to the slave node N12 is explained referring to a sequence chart shown in FIG. 4. The transmission/reception of data between the master node N10 and the respective slave nodes N11 to N13 is performed similarly to that of the first embodiment. In FIG. 4, when a transmission request of data is generated, the slave node N11 that is a transmission source of data transmits data D31 to the master node N10 after the waiting time after the certain period of time t1 similarly to the case of the general data shown in the first embodiment.

The master node N10 that has received the data D31 transmits data D32 relaying the data D31 to the slave node N12 before the certain period of time t1. Further, the slave node N12 that has received data D32 transmits ACK data D33 with respect to data D32 to the master node N10 before the certain period of time t1. Thereafter, the master node N10 that has received the ACK data D33 transmits ACK data D34 relaying the ACK data D33 to the slave node N11 before the certain period of time t1.

In this case, since all data D32 to D34 are transmitted before the certain period of time t1, a collision between the all data and general data can be reliably avoided, and a collision is not generated in a series of data transmission/reception sequences.

When receiving the data D31 and the ACK data D33, the master node N10 only relays the received data, transmits simply as data D32 and ACK data D34, and does not confirm the content received. Therefore, in the master node N10 a buffer for data relaying is not needed.

In the third embodiment, when transmission/reception of a series of data is performed among the slave node N11 to N13 via the master node N10, since data is transmitted after all carriers are gone before the certain period of time t1 during the transmission/reception of the series of data, a collision of the series of data can be reliably avoided.

Fourth Embodiment:

Next, a fourth embodiment of the present invention is explained. Although as many as four steps of transmission processes are performed in the case where transmission/reception of a series of data is performed among the slave nodes N11 to N13 in the third embodiment described above, transmission processes are reduced to three steps in the fourth embodiment to enhance the transmission efficiency.

Figure 5:
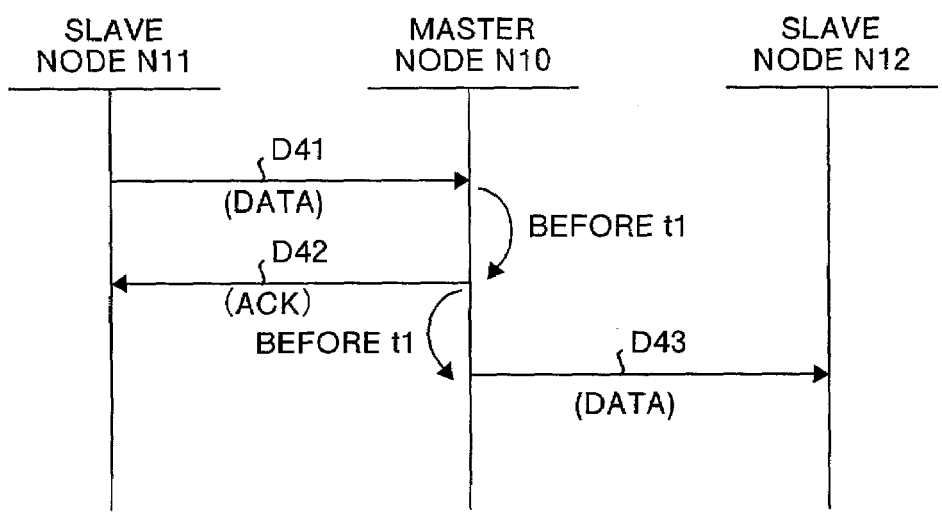
FIG. 5 is a sequence chart illustrating access control processing of a communication system according to a fourth embodiment of the present invention.

The structure of the communication system of the fourth embodiment is the same as that of the third embodiment. Here, a process in which the slave node N11 transmits data to the slave node N12 is explained referring to a sequence chart shown in FIG. 5. When a transmission request of data is generated, the slave node N11 that is a transmission source of data transmits data D41 to the master node N10 after the waiting time after the certain period of time t1 similarly to the case of the general data shown in the first embodiment.

The master node N10 that has received the data D41 confirms the reception of the data D41 and sends back ACK data D42 to the slave node N11 before the certain period of time t1. Thereafter, the master node N10 transmits data D43 relaying the data D41 to the slave node N12. The data D43 is transmitted after the transmission of the ACK data D42 before the certain period of time t1.

In this case, although the master node N10 confirms the reception of the data D41 which is relayed and received, one step of transmission processes of ACK data is eliminated in a series of data sequences compared to the third embodiment.

In the fourth embodiment, when a series of data transmissions/receptions is performed among the slave nodes N11 to N13 via the master node N10, since data is transmitted after all carriers are gone before the certain period of time t1 during the transmission/reception of the series of data, a collision of the series of data can be reliably avoided, and transmission processes for the transmission of the series of data can be decreased.

Fifth Embodiment:

Next, a fifth embodiment of the present invention is explained. Fifth embodiment is to improve the transmission efficiency in a case where multi-address data is transmitted in the fourth embodiment.

Figure 6:
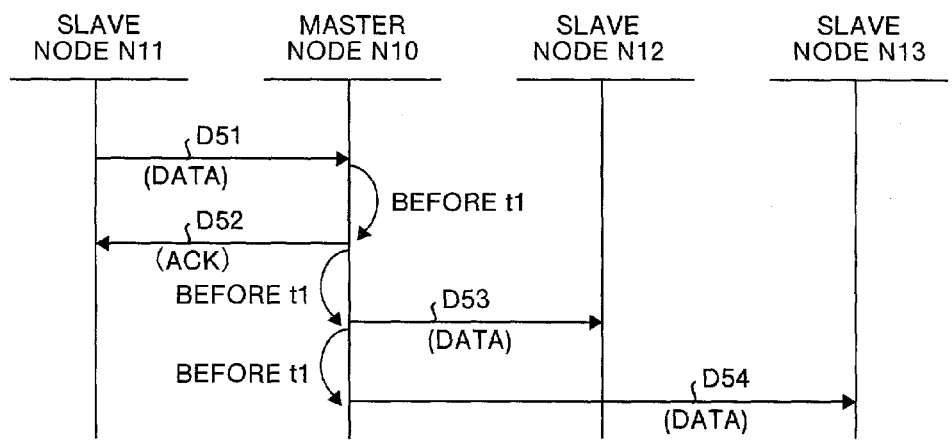
FIG. 6 is a sequence chart illustrating access control processing of a communication system according to a fifth embodiment of the present invention.

The structure of the communication system of the fifth embodiment is the same as that of the third embodiment. Here, a process in which the slave node N11 transmits multi-address data to the slave nodes N12, N13 is explained referring to a sequence chart shown in FIG. 6. When a transmission request of multi-address data is generated, the slave node N11 that is a transmission source of data transmits multi-address data D51 to the master node N10 after the waiting time after the certain period of time t1 similarly to the case of the general data shown in the first embodiment.

The master node N10 that has received the multi-address data D51 confirms the reception of the data D51 and sends back ACK data D52 to the slave node N11 before the certain period of time t1. Thereafter, the master node N10 transmits multi-address data D53, D54 that relay the data D51 in a multiple address form to the slave nodes N12, N13. The data D53 is transmitted after the transmission of the ACK data D52 before the certain period of time t1. The data D54 is transmitted after the transmission of the data D53 before the certain period of time t1.

In the fifth embodiment, corresponding to the fourth embodiment, although only the master node N10 transmits the ACK data D52 to the slave node N11, the invention is not limited to this, and corresponding to the third embodiment, the respective slave nodes that have received the multi-address data may transmit ACK data to the master node N10 before the certain period of time t1 so that the master node N10 can transmit the respective ACK data to the slave node of the transmission source, or ACK data is transmitted to the slave node of the transmission source when the master node N10 receives ACK data from all slave nodes of the transmission sources. In this case, all data is transmitted before the certain period of time t1.

In the fifth embodiment, since data is transmitted after all carriers are gone before the certain period of time t1 during the transmission/reception of a series of data even when the transmission/reception of multi-address data is performed among the slave nodes N11 to N13 via the master node N10, a collision of the series of data can be reliably avoided.

Sixth Embodiment:

Next, a sixth embodiment of the present invention is explained. Although data is transmitted after the waiting time after the certain period of time t1 when a slave node of a transmission source transmits data in any of the third embodiment to the fifth embodiment described above, even the first data collision can be reliably avoided in the sixth embodiment.

Figure 7:
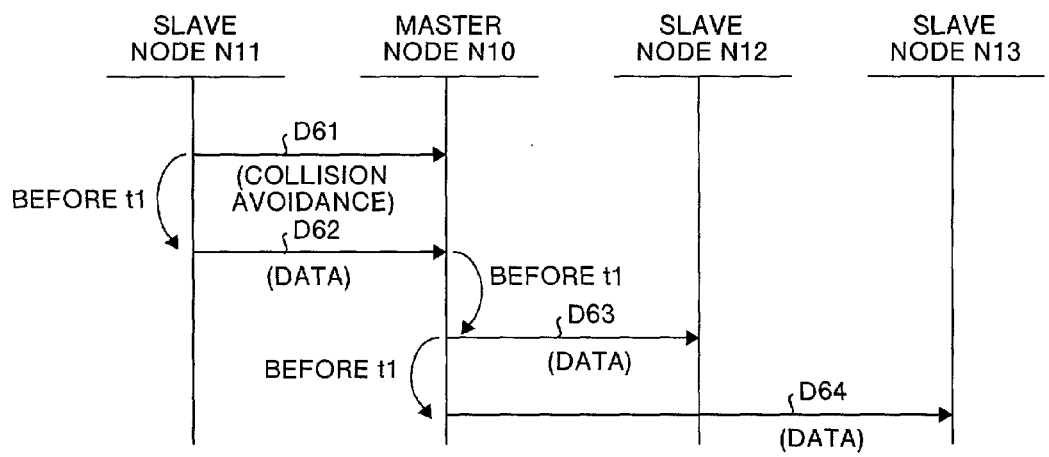
FIG. 7 is a sequence chart illustrating access control processing of a communication system according to a sixth embodiment of the present invention.

The structure of the communication system of the sixth embodiment is the same as that of the third embodiment. Here, a process in which the slave node N11 transmits multi-address data to the slave nodes N12, N13 is explained referring to a sequence chart shown in FIG. 7. When a transmission request of multi-address data is generated, the slave node N11 that is a transmission source of data transmits collision avoidance data D61 to the master node N10 after the waiting time after the certain period of time t1 similarly to the case of the general data shown in the first embodiment. The content of the collision avoidance data D61 is arbitrary and may be one by which a carrier can be generated on the transmission line N.

By the transmission of the collision avoidance data D61 to the transmission line N, other nodes detect a carrier, and when data is transmitted, the waiting time after the certain period of time t1 is set similarly to the case of the general data. The slave node N11 transmits multi-address data D62 to the master node N10 after the carrier of the collision avoidance data D61 is gone before the certain period of time t1. Accordingly, the multi-address data D62 avoids a collision and is reliably transmitted to the master node N10.

The master node N10 that has received the multi-address data D62 transmits the multi-address data D63 that relays multi-address data 62 in a multiple address form to the slave node N12 after the carrier of the multi-address data D62 is gone before the certain period of time t1. Further, the master node N10 transmits the multi-address data D64 to the slave node N13 after the transmission of the multi-address data D63 before the certain period of time t1.

In this case, ACK data is not needed, and the master node N10 or the slave nodes N12, N13 do not need to confirm reception. Since a collision of the multi-address data 62 is also avoided reliably by the collision avoidance data D61, a series of transmission processes can be performed reliably without any collision.

Although a case of the transmission of multi-address data is explained in the sixth embodiment described above, the present invention is not limited to this case, and even in a case of one-to-one transmission/reception, by transmitting the collision avoidance data D61 before data transmission and by transmitting data after the transmission of the collision avoidance data D61 before the certain period of time t1, a collision of all data in the transmission processes of the data can be avoided.

Even in a case where the master node N10 independently transmits data to another slave node, by transmitting the collision avoidance data D61, a collision of data can be reliably avoided. In this case, the master node N10 and the slave nodes N11 to N13 may hold the same transmission protocol.

In the sixth embodiment, since the collision avoidance data D61 is transmitted before a series of multi-address data transmission processes to perform transmission while forcibly avoiding a collision of the multi-address data D62, a collision of all data in a series of multi-address data transmission processes can be reliably avoided.

As described above, with the present invention, since the transmission control unit, in a case where new transmission of data, transmits the data to the transmission line at a random time randomly representing a time existing after a first time elapses until a second time elapses from a time when a carrier signal on the transmission line is gone and, when transmitting a data whose priority is high, transmits the data to the transmission line before the first time so as to avoid a collision of the data whose priority is high, produced is an effect that the transmission efficiency can be improved by a simple structure in which a collision is not detected.

With the next invention, since the data whose priority is high is set as ACK data representing a reception confirmation to avoid a collision of the ACK data, produced is an effect that reduction of the transmission efficiency due to retransmission of transmission data can be prevented.

With the next invention, since the data whose priority is high is set as NACK data representing a non-reception confirmation with respect to reception of a series of data groups to which sequence numbers are assigned to avoid a collision of the NACK data, all of a series of data groups does not have to be retransmitted, whereby produced is an effect that the transmission efficiency is improved.

With the next invention, since the transmission control unit of the communication device, when newly transmitting the data, transmits the data to the transmission line at a random time randomly representing a time existing after a first time elapses until a second time elapses from a time when a carrier signal on the transmission line is gone and, when transmitting a data that has been relayed, transmits the data to the transmission line before the first time so as to avoid a collision of the data relayed, a collision of relay data can be reliably avoided, and reception confirmation of data is not performed, whereby produced is an effect that data buffer at a time of relaying is not needed so that the structure can be made simple.

With the next invention, since the transmission control unit of the master communication device, when newly transmitting the data, transmits the data to the transmission line at a random time randomly representing a time existing after a first time elapses until a second time elapses from a time when a carrier signal on the transmission line is gone and, when receiving a data that has been relayed, transmits ACK data representing a reception confirmation of the data after the reception of the data is confirmed before the first time and transmits the data relayed to the transmission line before the first time from a time when a carrier signal of the ACK data is gone so as to decrease processes of ACK data in a series of transmission processes, produced is an effect that the data transmission processes become simple so that the transmission efficiency can be improved.

With the next invention, since the transmission control unit of the master communication device, when newly transmitting the data, transmits the data to the transmission line at a random time randomly representing a time existing after a first time elapses until a second time elapses from a time when a carrier signal on the transmission line is gone and, in a case where multi-address data relayed is received, repeats processing in which the master communication device transmits ACK data representing a reception confirmation of the data after the reception of the data is confirmed before the first time, transmits the multi-address data relayed to the transmission line before the first time from a time when a carrier signal of the ACK data is gone, and transmits the multi-address data before the first time from a time when a carrier signal of the multi-address data is gone so as to avoid a collision of the multi-address data, a collision of the multi-address data can be avoided even in a case where multi-address data with a large number of transmission processes is transmitted, whereby produced is an effect that the transmission efficiency can be improved.

With the next invention, since the transmission control unit of the master communication device, in a case where the communication device newly transmits data, transmits the data to the transmission line at a random time randomly representing a time existing after a first time elapses until a second time elapses from a time when a carrier signal on the transmission line is gone and, in a case where multi-address data is transmitted, transmits collision avoidance data that is arbitrary data generating a carrier signal on the transmission line at a random time randomly representing a time existing after a first time elapses until a second time elapses from a time when a carrier signal on the transmission line is gone and transmits the multi-address data before the first time from a time when a carrier signal of the collision avoidance data is gone, and the transmission control unit of the master communication device, when receiving the multi-address data, repeats processing in which the multi-address data is transmitted to the transmission line before the first time from a time when the carrier signal of the multi-address data is gone so as to avoid even a collision of the data transmitted from the communication device of the transmission source, produced are effects that reliable data transmission can be performed and the transmission efficiency can be further improved.

With the next invention, since the transmission control unit of the master communication device, in a case where the communication device newly transmits data, transmits the data to the transmission line at a random time randomly representing a time existing after a first time elapses until a second time elapses from a time when a carrier signal on the transmission line is gone and, when transmitting a data whose priority is high, transmits collision avoidance data that is arbitrary data generating a carrier signal on the transmission line at a random time randomly representing a time existing after a first time elapses until a second time elapses from a time when a carrier signal on the transmission line is gone and transmits the data whose priority is high before the first time from a time when a carrier signal of the collision avoidance data is gone, and the transmission control unit of the master communication device, when the data whose priority is high is received, transmits the data whose priority is high to the transmission line before the first time from a time when the carrier signal of the data whose priority is high is gone so as to avoid a collision of the data whose priority is high, produced is an effect that data whose priority is high can be reliably transmitted.

With the next invention, since the transmission control unit, when newly transmitting the data, transmits the data to the transmission line at a random time randomly representing a time existing after a first time elapses until a second time elapses from a time when a carrier signal on the transmission line is gone and, when transmitting a data whose priority is high, transmits the data to the transmission line before the first time, produced is an effect that even by a simple structure in which a collision is not detected, the transmission efficiency can be improved.

With the next invention, since the transmission control unit, when newly transmitting the data, transmits the data to the transmission line at a random time randomly representing a time existing after a first time elapses until a second time elapses from a time when a carrier signal on the transmission line is gone and, when transmitting a data whose priority is high, transmits collision avoidance data that is arbitrary data generating a carrier signal on the transmission line at a random time randomly representing a time existing after a first time elapses until a second time elapses from a time when a carrier signal on the transmission line is gone and transmits the data whose priority is high to the transmission line before the first time from a time when a carrier signal of the collision avoidance data is gone, produced is an effect that a collision of all data in the data transmission processes can be avoided.

With the next invention, in the data transmission step, when newly transmitting the data, the respective communication devices transmit the data to the transmission line at a random time randomly representing a time existing after a first time elapses until a second time elapses from a time when a carrier signal on the transmission line is gone, and in the priority data transmission step, in a case where a transmission request of data whose priority is high is generated, the data whose priority is high is transmitted to the transmission line before the first time. Thus, produced is an effect that even not in a case where a carrier on the transmission line is detected to detect a collision, a collision of data whose priority is high can be reliably avoided so that the transmission efficiency can be improved.

With the next invention, since the data whose priority is high is set as ACK data representing a reception confirmation to avoid a collision of the ACK data, produced is an effect that reduction of the transmission efficiency due to retransmission of transmission data can be prevented.

With the next invention, since the data whose priority is high is set as NACK data representing a non-reception confirmation with respect to reception of a series of data groups to which sequence numbers are assigned to avoid a collision of the NACK data, all of a series of data groups does not have to be retransmitted, whereby produced is an effect that the transmission efficiency is improved.

With this invention, in the data transmission step, in a case where a slave communication device of a transmission source transmits data whose transmission is requested, the data is transmitted to the master communication device at a random time randomly representing a time existing after a first time elapses until a second time elapses from a time when a carrier signal on the transmission line is gone, in the data relay step, the master communication device that has received the data receives the data and transmits the data to a slave communication device of a transmission destination before the first time elapses from a time when a carrier signal of the data on the transmission line is gone, in the ACK transmission step, the slave communication device of the transmission destination transmits ACK data representing a reception confirmation to the master communication device after the reception of the data is confirmed before the first time, and in the ACK relay transmission step, the master communication device that has received the ACK data receives the ACK data and transmits the ACK data to the slave communication device of the transmission source before the first time elapses from a time when a carrier signal of the ACK data on the transmission line is gone. Thus, produced are effects that a collision of relay data can be reliably avoided, and simple relay processing can be performed since reception confirmation of data is not performed.

With the next invention, in the a data transmission step, in a case where a slave communication device of a transmission source transmits data whose transmission is requested, the data is transmitted to the master communication device at a random time randomly representing a time existing after a first time elapses until a second time elapses from a time when a carrier signal on the transmission line is gone, in the ACK transmission step, the master communication device that has received the data transmits ACK data representing a reception confirmation to the slave communication device of the transmission source after the reception of the data is confirmed before the first time, and in the data relay transmission step, the master communication device transmits the data to a slave communication device of a transmission destination after the transmission of the ACK data before the first time from a time when a carrier signal of the ACK data is gone. Thus, produced is an effect that the data transmission processes becomes simple so that the transmission efficiency can be improved.

With the next invention, in the multi-address data transmission step, in a case where a slave communication device of a transmission source transmits multi-address data whose transmission is requested, the multi-address data is transmitted to the master communication device at a random time randomly representing a time existing after a first time elapses until a second time elapses from a time when a carrier signal on the transmission line is gone, in the ACK transmission step, the master communication device that has received the multi-address data transmits ACK data representing a reception confirmation to the slave communication device of the transmission source after the reception of the multi-address data is confirmed before the first time, and in the multi-address data relay transmission step, the master communication device repeats processing in which the master communication device transmits the multi-address data to a slave communication device of a transmission destination after the transmission of the ACK data before the first time from a time when a carrier signal of the ACK data is gone and transmits the multi-address data to a slave communication device of a transmission destination before the first time from a time when a carrier signal of the multi-address data is gone. Thus, produced is an effect that even in a case where multi-address data with a large number of transmission processes is transmitted, a collision of the multi-address data can be avoided so that the transmission efficiency can be improved.

With the next invention, in the collision avoidance data transmission step, in a case where a slave communication device of a transmission source transmits multi-address data whose transmission is requested, collision avoidance data that is arbitrary data generating a carrier signal on the transmission line is transmitted at a random time randomly representing a time existing after a first time elapses until a second time elapses from a time when a carrier signal on the transmission line is gone, in the multi-address data relay transmission step, the slave communication device of the transmission source transmits the multi-address data to the master communication device before the first time from a time when a carrier signal of the collision avoidance data is gone, and in the multi-address data relay transmission step, the master communication device repeats processing in which the master communication device that has received the multi-address data transmits the multi-address data to a slave communication device of a transmission destination before the first time from a time when a carrier signal of the multi-address data is gone and transmits the multi-address data to a slave communication device of a transmission destination before the first time from a time when a carrier signal of the multi-address data is gone so as to avoid even a collision of the data transmitted from the communication device of the transmission source. Thus, produced are effects that reliable data transmission can be performed and the transmission efficiency can be further improved.

INDUSTRIAL APPLICABILITY

As described above, in the communication systems, the communication devices, and the communication methods according to the present invention, a plurality of communication devices connected to a transmission line adjust transmission timing of data based on a detection result of a carrier signal of another communication device, and thus the present invention is suitable for prevention of a collision between signals.

We claim:

1. A communication system comprising:
a plurality of communication devices being connected to a transmission line and divided into one master communication device and other slave communication devices to logically form a star-type connection and adjusting transmission timing of data based on a detection result of a carrier signal of another communication device to prevent a collision between signals, thereby performing transmission or reception of the data via the master communication device,
wherein the data includes first multi-address data to be relayed, ACK data representing a reception confirmation of the first multi-address data, second multi-address data for relaying the first multi-address data, third multi-address data for relaying the first multi-address data, and general data, the master communication device includes a transmission control unit configured to transmit the general data at a random time determined by random numbers set after elapse of a first time and before elapse of a second time from a time when the carrier signal on the transmission line is gone, when newly transmitting the data, and to transmit the ACK data to the transmission line before elapse of the first time from a time when the master communication device confirms reception of the first multi-address data and, when the first multi-address data is received, to transmit the second multi-address data to the transmission line before elapse of the first time from a time when a carrier signal of the ACK data is gone, and to subsequently transmit the third multi-address data before elapse of the first time from a time when a carrier signal of the second multi-address data is gone.

2. A communication system comprising:

a plurality of communication devices being connected to a transmission line and divided into one master communication device and other slave communication devices to logically form a star-type connection and adjusting transmission timing of data based on a detection result of a carrier signal of another communication device to prevent a collision between signals, thereby performing transmission or reception of the data via the master communication device, wherein the data includes first multi-address data to be relayed, collision avoidance data that is arbitrary data for generating a carrier signal on the transmission line, second multi-address data for relaying the first multi-address data, third multi-address data for relaying the first multi-address data and general data, each of the plurality of communication devices includes a transmission control unit configured to transmit the general data at a random time determined by random numbers set after elapse of a first time and before elapse of a second time from a time when the carrier signal on the transmission line is gone, when newly transmitting the data, to transmit the collision avoidance data at a random time determined by random numbers set after elapse of the first time and before elapse of the second time from a time when the carrier signal on the transmission line is gone, when transmitting the multi-address data, and to transmit the multi-address data before elapse of the first time from a time when a carrier signal of the collision avoidance data is gone, when the multi-address data is transmitted, wherein a transmission control unit of the master communication device, when receiving the first multi-address data, transmits the second multi-address data to the transmission line before elapse of the first time from a time when a carrier signal of the first multi-address data is gone, and subsequently transmit the third multi-address data before elapse of the first time.

3. A communication method in which a plurality of communication devices are connected to a transmission line and divided into one master communication device and other slave communication devices to logically form a star-type connection and adjust transmission timing of data based on a detection result of a carrier signal of another communication device to prevent a collision between signals, thereby performing transmission or reception of the data via the master communication device, wherein the data includes first data whose transmission is requested and ACK data representing a reception confirmation of the first data, the communication method comprising:

a data transmission step of transmitting the first data to the master communication device at a random time determined by random numbers set after elapse of a first time and before elapse of a second time from a time when the carrier signal on the transmission line is gone in a case where a slave communication device of a transmission source transmits the first data by request;

a data relay step in which the master communication device that has received the first data transmits the first data to a slave communication device of a transmission destination before elapse of the first time from a time when a carrier signal of the first data on the transmission line is gone;

an ACK transmission step in which the slave communication device of the transmission destination transmits ACK data representing a reception confirmation to the master communication device after the reception of the data is confirmed before elapse of the first time; and an ACK relay transmission step in which the master communication device that has received the ACK data transmits the ACK data to the slave communication device of the transmission source before elapse of the first time from a time when a carrier signal of the ACK data on the transmission line is gone.

4. A communication method in which a plurality of communication devices are connected to a transmission line and divided into one master communication device and other slave communication devices to logically form a star-type connection and adjust transmission timing of data based on a detection result of a carrier signal of another communication device to prevent a collision between signals, thereby performing transmission or reception of the data via the master communication device, wherein the data includes first data whose transmission is requested and ACK data representing a reception confirmation of the first data, the communication method comprising:

a data transmission step of transmitting the first data to the master communication device at a random time determined by random numbers set after elapse of a first time and before elapse of a second time from a time when the carrier signal on the transmission line is gone in a case where a slave communication device of a transmission source transmits the first data by request;

an ACK transmission step in which the master communication device that has received the first data transmits the ACK data representing a reception confirmation to the slave communication device of the transmission source after the reception of the first data is confirmed before elapse of the first time; and a data relay transmission step in which the master communication device transmits the first data to a slave communication device of a transmission destination after the transmission of the ACK data before elapse of the first time from a time when a carrier signal of the ACK data is gone.

5. A communication method in which a plurality of communication devices are connected to a transmission line and divided into one master communication device and other slave communication devices to logically form a star-type connection and adjust transmission timing of data based on a detection result of a carrier signal of another communication device to prevent a collision between signals, thereby performing transmission or reception of the data via the master communication device, wherein the data includes multi-address data whose transmission is requested and ACK data representing a reception confirmation of the multi-address data, the communication method comprising:

a multi-address data transmission step of transmitting the multi-address data to the master communication device at a random time determined by random numbers set after elapse of a first time and before elapse of a second time from a time when the carrier signal on the transmission line is gone in a case where a slave communication device of a transmission source transmits the multi-address data by request;

an ACK transmission step in which the master communication device that has received the multi-address data transmits the ACK data representing a reception confirmation to the slave communication device of the transmission source after the reception of the multi-address data is confirmed before elapse of the first time; and a multi-address data relay transmission step of processing a series of data transmissions in which the master communication device transmits the multi-address data to a slave communication device of a transmission destination after the transmission of the ACK data before elapse of the first time from a time when a carrier signal of the ACK data is gone and transmits the multi-address data to a slave communication device of a transmission destination before elapse of the first time from a time when a carrier signal of the multi-address data is gone.

6. A communication method in which a plurality of communication devices are connected to a transmission line and divided into one master communication device and other slave communication devices to logically form a star-type connection and adjust transmission timing of data based on a detection result of a carrier signal of another communication device to prevent a collision between signals, thereby performing transmission or reception of the data via the master communication device, wherein the data includes collision avoidance data that is arbitrary data generating a carrier signal on the transmission line and multi-address data whose transmission is requested, the communication method comprising:

a collision avoidance data transmission step of transmitting the collision avoidance data at a random time determined by random numbers set after elapse of a first time and before elapse of a second time from a time when the carrier signal on the transmission line is gone in a case where a slave communication device of a transmission source transmits the multi-address data by request;

a multi-address data relay transmission step in which the slave communication device of the transmission source transmits the multi-address data to the master communication device before elapse of the first time from a time when a carrier signal of the collision avoidance data is gone; and an multi-address data relay transmission step of processing a series of data transmissions in which the master communication device that has received the multi-address data transmits the multi-address data to a slave communication device of a transmission destination before elapse of the first time from a time when a carrier signal of the multi-address data is gone and transmits the multi-address data to a slave communication device of a transmission destination before elapse of the first time from a time when the carrier signal of the multi-address data is gone.

* * * * *